Patented Aug. 27, 1935

2,012,387

UNITED STATES PATENT OFFICE 2,012,387

TRISAZODYESTUFFS

Eugen Glietenberg and August Sigwart, Leverkusen-I. G.-Werk, Germany, assignors to General Aniline Works, Inc., New York, N. Y., a corporation of Delaware No Drawing. Application October 29, 1934, Serial No. 750,592. In Germany November 3, 1933

4 Claims. (Cl. 260—74)

The present invention relates to trisazodyestuffs, more particularly it relates to dyestuffs which may be represented by the probable general formula:

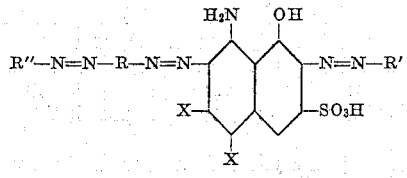

wherein one X stands for a sulfonic acid group, the other X stands for a hydrogen atom, R stands for a diphenyl radical, R' stands for the radical of an unsulfonated diazo compound suitable for producing azodyestuffs, and R'' stands for the radical of a m-phenylenediamine coupling component in which one hydrogen atom of one amino group is substituted by an alkylsulfonyl-, aralkylsulfonyl- or arylsulfonyl radical, in which one hydrogen atom of the other amino group may be substituted by an alkyl group or a substituted alkyl group, such as hydroxyalkyl or -aralkyl, and which phenylenediamino compound may be substituted otherwise.

Our new dyestuffs are obtainable by coupling in an acid medium one molecular proportion of a tetrazodiphenyl compound with one molecular proportion of 1-amino-8-naphthol-3.6- or -4.6-disulfonic acid, then in an alkaline medium, with one molecular proportion of an unsulfonated monodiazo compound and finally with one molecule proportion of a m-phenylenediamine compound, in which one hydrogen atom of one amino group is substituted by an alkylsulfonyl-, aralkylsulfonyl- or arylsulfonyl radical and in which one hydrogen atom of the other amino group may be substituted by an alkyl group or a substituted alkyl group.

Our new dyestuffs generally dye cotton from a neutral or weakly acid bath black shades. Further they possess the valuable property of dyeing different kinds of fibres the same shades, and therefore are suitable for dyeing mixed fabrics, consisting, for example, of cotton, wool, silk and artificial silk.

The invention is illustrated by the following examples, without being limited thereto:

*Example 1.*—184 kgs. of benzidine are tetrazotized in the usual manner and coupled in a mineral acid medium with 341 kgs. of 1-amino-8-naphthol-3,6-disulfonic acid. When the formation of the intermediate product is complete, the same is coupled in a soda-alkaline medium with a diazobenzene solution prepared from 73 kgs. of aniline. When the diazobenzene has disappeared, 186 kgs. of 1-methylsulfamido-3-aminobenzene dissolved in water are added. After a short time the coupling is complete. The dyestuff having in the free state probably the following formula:

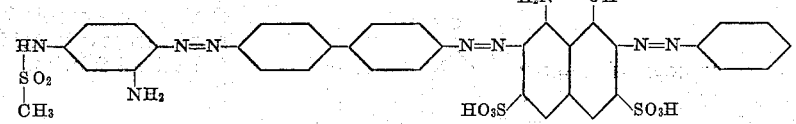

is isolated in the usual manner; it dyes cotton from a soda-alkaline bath and also from a weakly acid bath greenish-black shades of good fastness to acid, and is preferably suitable for dyeing mixed fabrics.

When substituting the 1,8-aminonaphthol-3,6-disulfonic acid by the equivalent quantity of 1,8-aminonaphthol-4,6-disulfonic acid, a dyestuff yielding somewhat more blue shades is obtained.

When substituting the benzidine by equivalent quantities of 4,4'-diamino-3,3'-dimethyl-1,1'-diphenyl, or of 4,4'-diamino-3,3'-dimethoxy- or -diethoxy-1,1'-diphenyl, or of 4,4'-diamino-3,3'-dichloro-1,1'-diphenyl, there are obtained dyestuffs exerting similar properties.

When substituting the diazobenzene by an equivalent quantity of diazotized o-toluidine, or o-chloro-p-methyl-aniline, or m-chloroaminobenzene, or p-anisidine, there are obtained dyestuffs exerting similar properties.

When substituting the 1-methyl-sulfamido-3-aminobenzene by 2-phenylsulfamido-4-toluidine, or by 1-benzylsulfamido-3-amidobenzene, or by 1,4'-chlorobenzyl-sulfamido-3-aminobenzene, or by 1-methyl-sulfamido-3-amino-6-chlorobenzene, or by 1-phenylsulfamido-3-methylaminobenzene, or by 1-benzylsulfamino-3-methylaminobenzene, there are obtained dyestuffs exerting similar properties.

When substituting the 1-methyl-sulfamido-3-aminobenzene by 4-phenylsulfamido-2-toluidine, there is obtained a dyestuff dyeing somewhat more redder shades but exerting otherwise similar properties.

When substituting the 1-methylsulfamido-3-aminobenzene by 1-methylsulfamido-3-hydroxyethylamidobenzene, or by 1-phenylsulfamido-2-methyl-5-hydroxyethylamidobenzene, there are obtained dyestuffs exerting similar properties.

We claim:

1. Trisazodyestuffs of general formula:

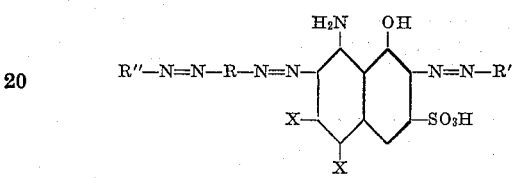

wherein one X stands for a sulfonic acid group, the other X stands for a hydrogen atom, R stands for a diphenyl radical, R' stands for a radical of an unsulfonated diazo compound suitable for producing azodyestuffs, and R'' stands for the radical of a m-phenylenediamine coupling component, in which one hydrogen atom of one amino group is substituted by an alkylsulfonyl-, arylsulfonyl- or aralkylsulfonyl-radical, and in which one hydrogen atom of the other amino group may be substituted by alkyl, dyeing cotton from a neutral or weakly acid bath generally black shades and being suitable for dyeing mixed fabrics.

2. Trisazodyestuffs of the general formula:

wherein one X stands for a sulfonic acid group, the other X stands for a hydrogen atom, R stands for a diphenyl radical to which the azo-bridges are attached in the 4.4'-positions, R' stands for an unsulfonated radical of the benzene series, and R'' stands for the radical of a m-phenylenediamine coupling component, in which one hydrogen atom of one amino group is substituted by an alkylsulfonyl-, arylsulfonyl- or aralkylsulfonyl-radical, and in which one hydrogen atom of the other amino group may be substituted by alkyl, dyeing cotton from a neutral or weakly acid bath generally black shades and being suitable for dyeing mixed fabrics.

3. Trisazodyestuffs of the general formula:

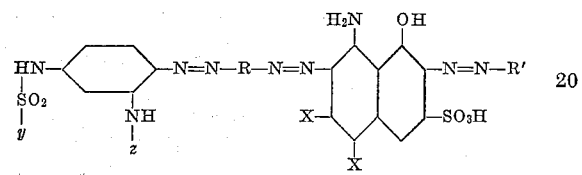

wherein one X stands for a sulfonic acid group, the other X stands for a hydrogen atom, R stands for a diphenyl radical to which the azo-bridges are attached in the 4.4'-positions, R' stands for an unsulfonated radical of the benzene series, $y$ stands for alkyl, aryl or aralkyl, and $z$ stands for hydrogen, alkyl or hydroxyalkyl, dyeing cotton from a neutral or weakly acid bath generally black shades and being suitable for dyeing mixed fabrics.

4. The trisazodyestuff of the following formula:

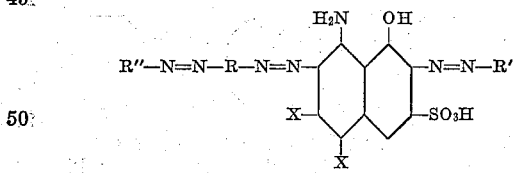

dyeing cotton from a soda-alkaline bath and also from a weakly acid bath greenish-black shades of good fastness to acid, and being suitable for dyeing mixed fabrics.

EUGEN GLIETENBERG.
AUGUST SIGWART.